United States Patent [19]

Harding et al.

[11] 4,446,585
[45] May 8, 1984

[54] PORTABLE TOILET

[75] Inventors: George W. Harding, Clearwater, Fla.; Ronald E. Sears, Bloomfield Hills, Mich.

[73] Assignee: Sani-Jon Mfg., Inc., Troy, Mich.

[21] Appl. No.: 341,731

[22] Filed: Jan. 22, 1982

[51] Int. Cl.³ .............................................. A47K 11/02
[52] U.S. Cl. ........................................ 4/460; 52/282; 4/614
[58] Field of Search .................. 4/460, 462, 463, 449, 4/459, 237, 234, 612–614; 52/282, 285, 262

[56] References Cited

U.S. PATENT DOCUMENTS

| | | | |
|---|---|---|---|
| 1,752,661 | 4/1930 | Campbell | 52/285 X |
| 2,065,531 | 12/1936 | Kerr | 4/612 |
| 2,241,860 | 5/1941 | Kerr | 52/282 X |
| 3,204,373 | 9/1965 | Small | 52/282 X |
| 3,380,768 | 4/1968 | Wolfensberger | 52/282 X |
| 3,447,167 | 6/1969 | Harding | 4/462 |
| 3,460,165 | 8/1969 | Brobny | 4/459 |
| 3,520,005 | 7/1970 | Downes | 4/234 |
| 3,629,874 | 12/1971 | Beller | 4/462 |
| 3,728,834 | 4/1973 | Dean | 52/282 |
| 3,863,276 | 2/1975 | Agnew et al. | 4/237 |
| 4,305,164 | 12/1981 | Sargent et al. | 4/460 X |

FOREIGN PATENT DOCUMENTS

| | | | |
|---|---|---|---|
| 1291460 | 3/1969 | Fed. Rep. of Germany | 52/282 |

*Primary Examiner*—Charles E. Phillips
*Attorney, Agent, or Firm*—Krass, Young & Schivley

[57] ABSTRACT

A rugged and aesthetically pleasing cabana construction for a portable toilet is disclosed. Resilient plastic walls of the structure are connected to W-shaped corner extrusions to provide the cabana with indented corners to protect them from physical damage. The walls are secured in such a manner so as to minimize shear forces on the fasteners securing the edges of the walls to the corner extrusions. A cover hinged to the effluent holding tank is provided with an integral toilet seat. Preferably, the walls are co-extruded polyethylene plastic sheets with a double useable face, the inner faces of which have the same matching color to provide the interior of the cabana with a uniform aesthetically pleasing appearance while allowing the exterior of the cabana to be multicolored if desired.

3 Claims, 6 Drawing Figures

U.S. Patent    May 8, 1984    4,446,585
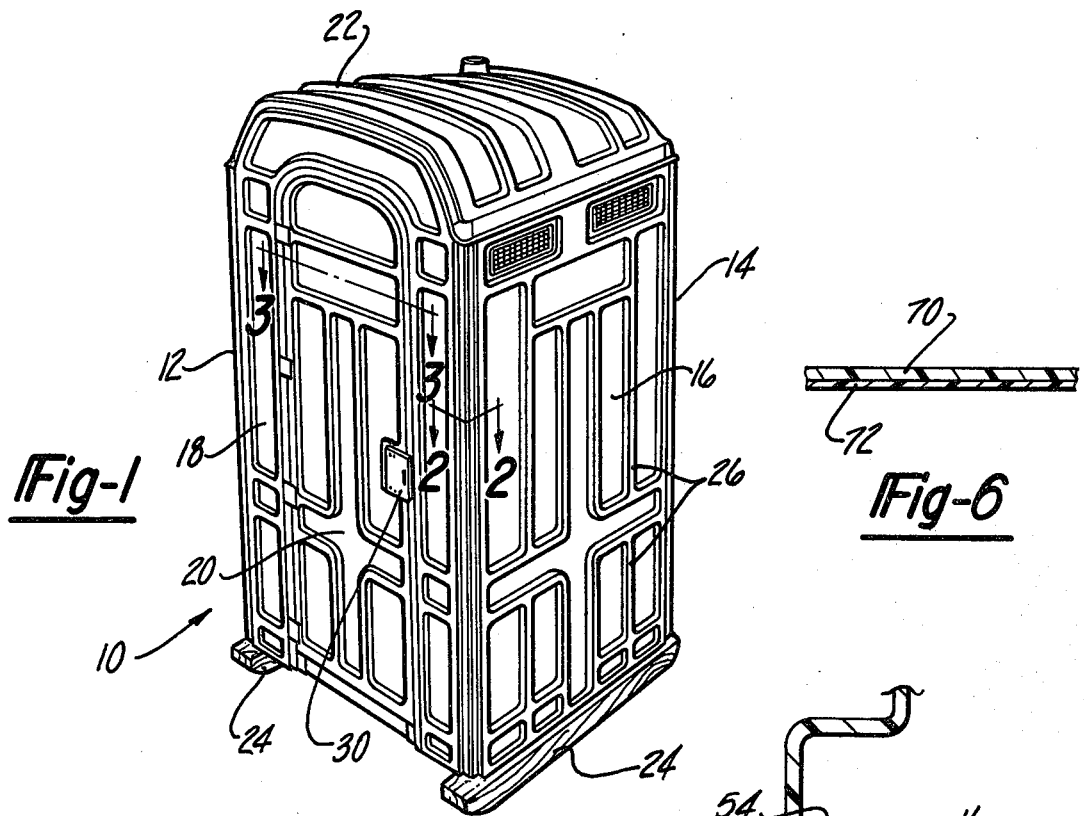
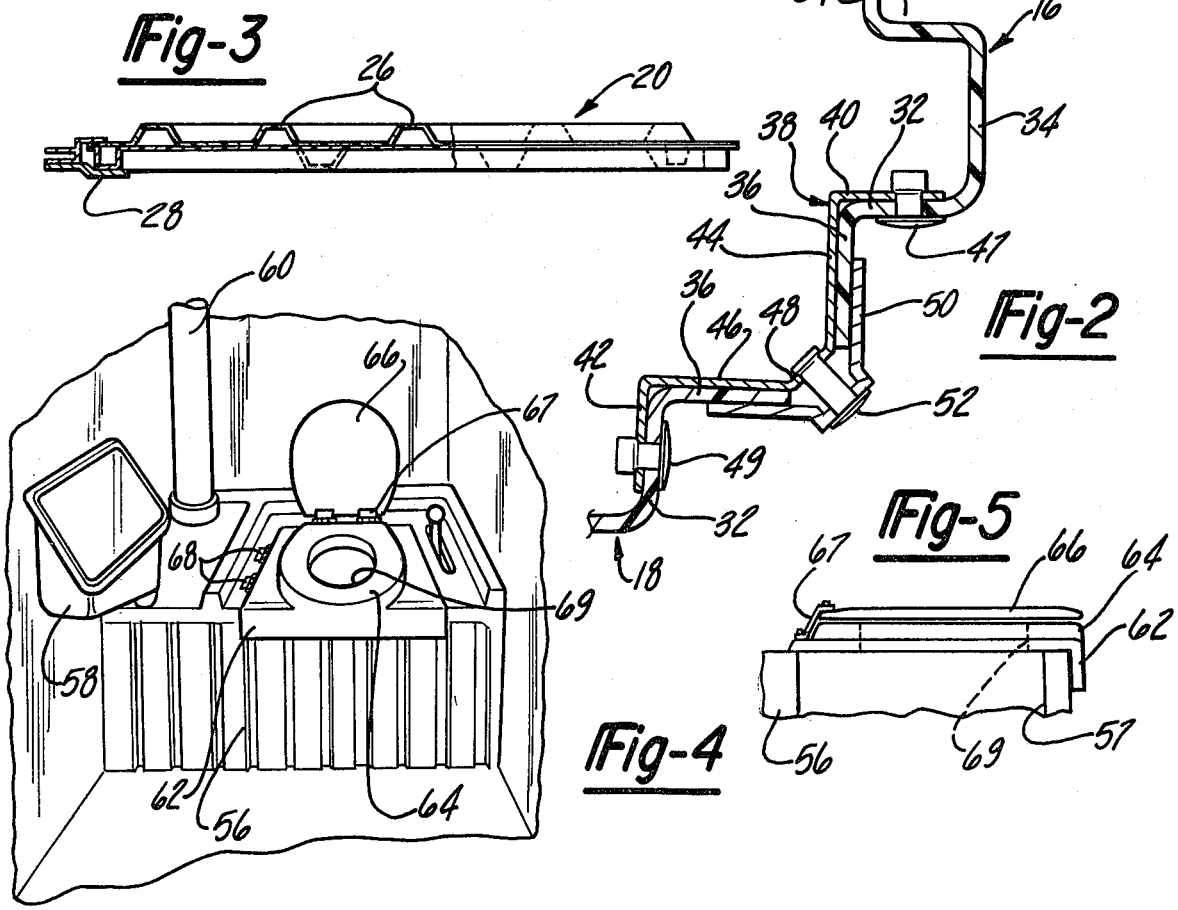

PORTABLE TOILET

DESCRIPTION

1. Technical Field

This invention relates to chemical portable toilets and, particularly, to constructions of such portable toilets using plastic walls.

2. Background Art

Chemical or portable toilets are often used, for example, at construction or recreation sites. At one time they were primarily made of a wood or metal construction. These structures were quite heavy and thus, difficult to transport from place to place.

Lightweight plastic cabanas, on the other hand, are much easier to transport. Unfortunately, the plastic cabanas are more susceptable to damage. U.S. Pat. Nos. 3,447,167 to Harding, 3,835,480 to Harding, 3,932,925 to Harding and 4,031,572 to Harding disclose representative examples of plastic portable toilet constructions known in the art. These constructions are generally eliptical in cross section and the latter patents utilize shell members which can be stacked to form the completed structure. While constructions of these types have performed quite satisfactorily in the field, they have been somewhat costly to manufacture due to their custom designed eliptical shape.

Portable toilet cabanas of a rectangular cross section using more conventional plastic wall panels are also known in the trade. However, many of these constructions cannot take the physical abuse experienced during conventional methods of moving the cabanas to different locations or the adverse environmental conditions that the cabanas often encounter. The plastic panels have a tendency to flx in windy conditions, thus creating shear forces on the fasteners used to connect the panels into a completed structure. Consequently, these shear forces may cause the panels to rip away from the fasteners creating holes therein resulting in a nonrigid cabana structure. In one cabana design the edges of the plastic wall panels are bent outwardly into mating flange portions which stick out from the otherwise flat outer faces of the walls. The mating flange portions are then fastened together by rivets or the like. In addition to the shear force problem noted above, this construction also tends to decrease the stability of the unit because the outwardly projecting corner flanges create additional wind resistance for the structure. These outwardly projecting flanges are also subject to damage when the cabanas are transported. Typically, these units are moved by a forklift having a chain, cable or the like surrounding the outer middle portion of the cabana to secure it to the forklift during movement. The forces created by the chain may be sufficient to break the plastic corner flanges.

It is also desirous to provide portable toilet cabana constructions with an aesthetically pleasing appearance as possible while at the same time keeping manufacturing costs at a minimum. Unfortunately, these considerations are often not compatible. For example, one known portable toilet construction utilizes a separate fiberglas insert in the interior of the cabana to provide it with a generally uniform color scheme. Unfortunately, this insert tends to unduly increase the manufacturing costs.

The present invention is directed to solving one or more of the problems noted above.

DISCLOSURE OF THE INVENTION

According to one aspect of this invention a portable toilet cabana is provided with upright walls made of a resilient material such as plastic. The sides of these walls have a flange portion displaced inwardly from the outer faces of the walls. Rigid corner posts are provided inboard of an imaginary projection of the outer faces of two adjacent walls. Each of the posts have two mutually orthogonal outer plate portions of sufficient dimension to overlap a portion of the wall flanges. The flanges of the walls are secured to the plate portions of the corner posts so that the corners of the cabana structure are indented to protect them from physical damage and the walls are secured to the post in such manner so as to minimize shear forces on the fastening devices when the walls flex under adverse environmental conditions.

In the preferred embodiment the corner posts take the form of W-shaped metal extrusions and the wall sides terminate in outer end portions bent at an angle with respect to the more intermediate flange portions. A cap riveted to the extrusion serves to cover the outer ends of the walls and provide a smooth finished corner.

According to another feature of this invention the wall sections are made of co-extruded plastic having discretely colored inner and outer portions. The inner portions of all of the wall sections are of the same matching color to provide the interior of the cabana with a uniform aesthetically pleasing appearance. If desired, the exterior of the cabana may be multicolored. Preferably, the walls are made of co-extruded polyethylene having double useable faces.

Still another aspect of this invention includes a cover hinged to the effluent holding tank. The cover includes an integral upstanding embossment therein defining a toilet seat. Preferably, the toilet seat is vacuum formed integral with the cover thereby minimizing manufacturing costs and potential for damage to the unit.

BRIEF DESCRIPTION OF THE DRAWINGS

These and other advantages of the present invention will become apparent to one skilled in the art upon reading the following specification and by reference to the drawings in which:

FIG. 1 is a perspective view of the preferred embodiment of the cabana construction of this invention;

FIG. 2 is a cross-sectional view along the lines 2—2 of FIG. 1;

FIG. 3 is a cross-sectional view along the lines 3—3 of FIG. 1;

FIG. 4 is a perspective view of the interior of the cabana;

FIG. 5 is a cross-sectional view of the cover and toilet seat construction; and

FIG. 6 is a cross-sectional view of a wall panel used in the preferred embodiment.

DESCRIPTION OF THE PREFERRED EMBODIMENT

Referring now to FIG. 1, the portable toilet cabana 10 of the preferred embodiment is of a rectangular horizontal cross-sectional configuration formed by four upright wall panels. The left, rear and right walls 12, 14 and 16, respectively, are substantially identical. The front wall includes an arch-shaped panel 18 to which a door 20 is connected. A roof 22 is suitably connected to the upper portions of the walls to complete the exterior structure. Cabana 10 is conveniently mounted on a pair of skids 24 to facilitate movement of the cabana with forklifts and the like.

The exterior walls are made of a resilient plastic, preferably linear polythylene sheets which have been extruded then rolled rather than cost into shape. Walls 12-18 are single sheets of plastic which have been vacuum formed to provide reinforcement ribs 26 in their major faces to add rigidity to the structure. As can be seen in FIG. 3, door 20 is formed by two sheets of polyethylene heat welded together and mounted for swinging rotation about a vertical edge of panel 18 by hinge 28. A suitable latch 30 may be provided for locking the door.

Special attention should be drawn to the corner construction of cabana 10 as shown in more detail in FIG. 2. Each vertical edge of the wall panels include an intermediate flange portion 32 displaced inwardly from the outer major face 34 of their respective wall panels. Preferably, flanges 32 are bent at about a 90° angle with respect to face 34. In the preferred embodiment the edges of the wall panels terminate in outer end portions 36 which are bent at an angle, preferably 90°, with respect to the intermediate flange portions 32 so as to be generally parallel with and projecting outwardly from the middle of panel face 34.

The vertical edges of the wall panels are connected together by rigid corner posts 38. Posts 38 may conveniently be provided by way of well known aluminum extrusion processes. Post 38 is generally "W-shaped" having mutually orthogonal outer plate portions 40 and 42 of sufficient dimension to overlap a majority of the wall flange portion 32. Rivets 47 and 49 operate to fasten the flange portions 32 of the walls to the plates 40 and 42 of walls 16 and 18, respectively. Intermediate post plate portions 44 and 46 meet at the apex of the "W" in a flat 48. An elongated V-shaped end cap 50 is connected to post 38 by way of rivet 52 passing through flat 48. Cap 50 serves to finish off the corner structure and enclose the edges of wall panels.

An examination of FIG. 2 will reveal that the corners of cabana 10 are indented. In other words, the corner posts 38 are inboard of an imaginary projection of the outer faces 34 of two adjacent walls. Additionally, the walls are fastened to corner posts 38 in a plane normal to the major outer faces 34 of the walls by way of rivets 47 and 49. Those skilled in the art will appreciate that this construction gives decided advantages over the prior art. When the walls flex under windy conditions the shear forces on rivets 47, 49 are minimized due to the offset fastening design of this invention. Accordingly, any tendency for the plastic walls to rip or tear away from the fasteners is reduced. The indented corner construction also protects the joint from abuse during movement of the cabana 10. This is because the indented joint will not come into contact with those mechanisms normally used to grasp the cabana for transporting same to another location. Further, the indented corner construction will not "catch" the wind and create instability as is the case in one prior art design.

Inboard of flange portion 32 in each panel is an indentation 54 running vertically the entire length thereof serving as hand holds to facilitate manual movement of the cabana.

The interior of cabana 10 is shown in FIGS. 4 and 5. It includes an effluent holding tank 56, a urinal 58 emptying into tank 56 and a ventilation stack 60. Pursuant to another feature of this invention a tank cover 62 includes an integrally formed seat 64 therein. Cover 62 is preferably polyethylene plastic which is vacuum formed with an integral upstanding embossment surrounding an interior hole 69 to define the toilet seat 64. Seat 64 may include a lid 66 hinged to cover 62 by hinge 67. Cover 62 is, in turn, mounted by hinges 68 to the top surface of tank 56 so that the entire assembly can be conveniently swung out of the way to permit easy access to the tank for cleaning.

The design of cover 62 with its integral seat 64 serves to minimize manufacturing costs by combining the functions of two separate items into one. The integral seat tends to be more steady than typical toilet seats due to the enlarged foundation of cover 62. Moreover, the potential for damage due to vandalism and continued use is minimized. The vacuum formed polyethylene seat is also capable of withstanding much lower temperatures without cracking or shattering than coventional toilet seats.

Still another aspect of this invention includes the use of thermoplastic sheets, at least for the walls of the cabana, which have been co-extruded with double useable faces. Co-extrusion is the simultaneous extrusion of two or more resins out of one die, involving materials of the same chemical structure having different colors, or polymers of dissimilar structure. There are generally two basic methods for co-extrusion of thermoplastic sheets: the feed block method using a conventional single manifold die, and the multimanifold method. In the feed block method a flat die is preceded by a feed block device in which the different layers of material are assembled. A secondary, and generally smaller extruder feeds resin melt to the feed block to be combined with the melt from the larger, primary extruder. Due to laminar, nonturbulent flow of the die the assembled materials from the feed block are extruded as separate and distinct layers in the sheet product. FIG. 6 illustrates a cross section of one of the wall panels of cabana 10 showing an outer layer 70 and an inner layer 72.

In the past, co-extruded sheets had only one useable face. In other words, the color and consistency of only one of the co-extruded layers was controlled during the co-extrusion process. The other layer was made with reground material and no care was taken to insure that the inner layer was of a uniform color or consistency. We have discovered that co-extruded thermoplastic sheets may be advantageously used as the walls of the cabana 10 to give the interior a uniform and aesthetically pleasing appearance at very little additional cost. By controlling the color of the inner layer 72, as well as the outer layer 70, the interior wall sections of the cabana will have the same matching color. Preferably, the interior layer 72 of the co-extruded sheets are provided with a light color such as gray whereas the outer layer 70 is provided with any of a variety of different colors. The color of the interior layer 72 may be easily controlled by monitoring the type and quantity of color die, as well as the resin being used in the co-extrusion process. In fact, the outer faces of the walls and/or roof of the cabana may be multicolored while at the same time providing a uniform interior color.

One skilled in the art will appreciate that various modifications to the specific embodiment disclosed may be made without departing from the spirit and scope of the present invention as defined by the following claims.

We claim:

1. A portable toilet comprising:

a plurality of unitary upright plastic walls, each wall being formed with reinforcement ribs and having an outer major face, four walls forming a structure of rectangular horizontal cross section with one wall having a door therein, and the structure having a roof, each vertical edge of the walls having a flange portion bent inwardly at about 90° angle from said outer major face of its respective wall, each of said vertical edges terminating in an outer end portion bent at about a 90° angle with respect to the flange portion thereby projecting parallel to and inwardly of said major face of its respective wall;

W-shaped metal corner posts having outer and intermediate plate portions generally conforming to the flange and outer end portions of the walls, respectively; said intermediate plate portions extending at 90° to each other and joined by a flat apex;

fastening means connecting the flange portions of said walls to the outer plates of said corner posts inboard of said structure;

an elongated V-shaped cover secured to the corner posts outboard of said structure by a fastening means extending through said apex, said cover covering the end portions of said walls;

said structure housing an effluent holding tank, a urinal emptying therein and a toilet seat giving access to said tank;

whereby the corners of the structure are indented to protect them from physical damage and the walls are secured to the corner posts in such manner so as to minimize shear forces on the fastening means when the walls flex.

2. The portable toilet of claim 1 wherein said effluent holding tank includes an enlarged opening in the top thereof;

a cover for the opening hinged to the tank and having an integral upstanding embossment surrounding an interior hole therein defining said toilet seat, and a lid hinged to the cover.

3. The portable toilet of claim 1 wherein the walls include indentations running the vertical length thereof adjacent the two front corners of the structure thereby serving as hand holds.

* * * * *